Nov. 5, 1935.  J. V. GIESLER ET AL  2,019,962
TEMPERATURE REGULATOR
Filed Oct. 19, 1933
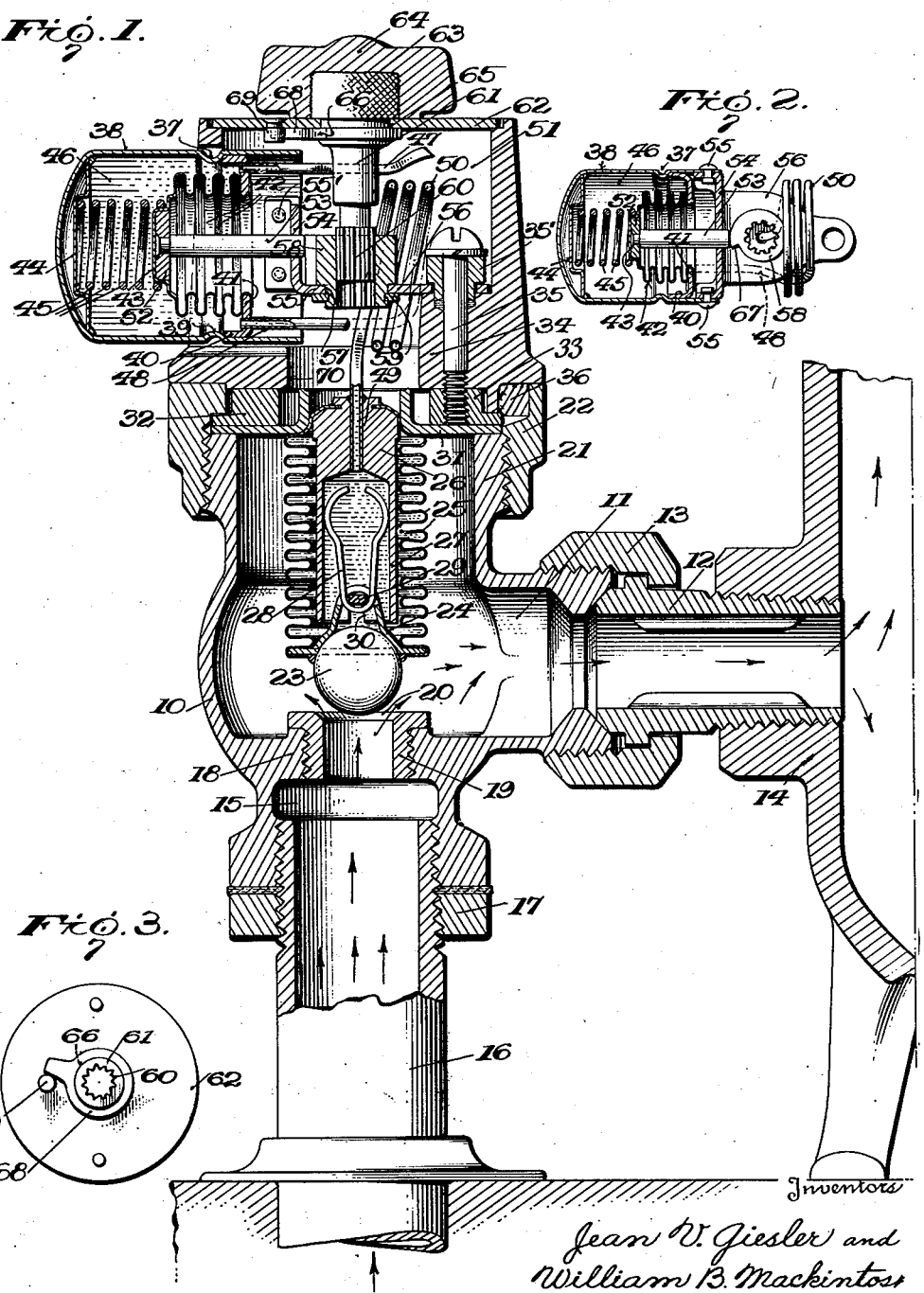
Inventors
Jean V. Giesler and
William B. Mackintosh
By Cameron, Kerkam & Sutton
Attorneys Patented Nov. 5, 1935

2,019,962

UNITED STATES PATENT OFFICE 2,019,962

TEMPERATURE REGULATOR

Jean V. Giesler, Knoxville, Tenn., and William B. Mackintosh, Youngwood, Pa., assignors to The Fulton Sylphon Company, Knoxville, Tenn., a corporation of Delaware Application October 19, 1933, Serial No. 694,322

20 Claims. (Cl. 236—36)

This invention relates to valves for heat exchangers, and more particularly to a valve of this character which normally operates automatically but which may be manually controlled and adjusted to predetermine the temperature to be maintained.

It has heretofore been proposed, as in the patent to Fitts, No. 1,425,189, of August 8, 1922, to provide a radiator valve with a hot motor vessel in heat interchanging relation with the heating fluid and supplied with a vaporizable liquid from a container of adjustable capacity mounted on the valve housing, constituting a unitary structure therewith. In devices of the type just characterized as heretofore proposed an effort has been made to completely insulate the container for the vaporizable liquid from the heat of the radiator, so that only the convection currents in the air, which as pointed out in said patent are generally of a lower temperature than that desired to be maintained, will influence said container, it being recognized that temperature regulation so afforded is not close, but may vary within considerable limits.

It is an object of the present invention to provide a device of the type just referred to wherein the container for vaporizable liquid is not completely insulated from the heat of the heating medium, but the heat of the heating medium is utilized to maintain said container at a temperature which is close to the boiling point of the contained liquid, to the end that a closer regulation may be effected by reason of the increased sensitivity of response at said container, and thereby a substantially straight line temperature regulation may be obtained.

Another object of this invention is to provide a temperature regulator for heat exchangers that is highly sensitive to fluctuations of temperature of the medium to which it is subjected.

Another object of this invention is to provide a temperature regulator for heat exchangers that will maintain a substantially straight line temperature control notwithstanding variations in the steam pressure.

Another object of this invention is to provide a temperature regulator for a heat exchanger that is automatically conditioned by changes in steam pressure so that the effects of said changes are compensated for and a substantially uniform temperature is maintained.

Another object of this invention is to provide a temperature regulator for heat exchangers which takes advantage of the fact that a vaporizable liquid has a higher coefficient of cubical expansion when close to its boiling point and wherein the temperature responsive element, although subjected to the air of the room or other compartment the temperature of which is to be controlled, is itself maintained at a temperature at which the thermo-sensitive liquid is close to its boiling point.

Another object of this invention is to provide a device of the type characterized wherein the container for the expansible and collapsible liquid is directly subject to convection air currents, so that prompt response to fluctuations in temperature of the air is not retarded by interposed bodies of air which have a more or less insulating effect, and wherein the said container is so constructed that the portion thereof exposed directly to the air currents not only affords a direct metallic conduction between the air and the vaporizable liquid contained therein but said container is of a rigidity of construction that minimizes the danger of injury thereto from contact with exterior elements.

Another object of this invention is to provide a device of the type characterized with improved adjusting means for varying the volume of the container for the vaporizable liquid whereby no unsymmetrical stress is imposed on said container, particularly with respect to the flexible element thereof.

Another object of this invention is to provide an improved temperature regulator for heat exchangers of the type employing a relatively hot vaporizing chamber into which liquid is ejected from a container filled with said liquid and subjected to the ambient to be controlled wherein said hot vessel and container are combined in a unit with the valve to be controlled.

Another object of this invention is to provide a device of the type last characterized with readily adjustable means for predetermining the temperature to be maintained by said heat exchanger.

Another object of this invention is to provide a device of the type characterized which is composed of parts that are relatively inexpensive to manufacture and assemble, which is simple in construction and efficient in operation, which occupies little more space than that commonly occupied by hand operated radiator valves, and which can be easily manipulated to either effect the closure of the radiator valve or to predetermine the temperature to be maintained in the ambient.

Other objects will appear as the description of the invention proceeds.

The invention is capable of receiving a variety of mechanical expressions, one of which is shown on the accompanying drawing, but it is to be expressly understood that the drawing is for purposes of illustration only and is not to be construed as a definition of the limits of the invention, reference being had to the appended claims for that purpose.

Referring in detail to said drawing, wherein the same reference characters are employed to designate corresponding parts in the several figures:—

Fig. 1 is an axial section of a radiator valve embodying the present invention;

Fig. 2 is a plan view of the adjustable container for the vaporizable liquid and its adjusting mechanism, removed from its casing and on a smaller scale than Fig. 1; and Fig. 3 is a detail view, on a smaller scale, of the means for limiting the movement of the adjusting mechanism.

In the embodiment illustrated, 10 designates a valve casing of any suitable size, construction and material. As shown the outlet 11 is connected by a conventional tail piece 12 and tail nut 13 to the inlet of a radiator 14, while the inlet 15 of said casing is connected to a supply pipe 16 by a conventional threaded coupling 17. Mounted in a partition 18 within said valve housing 10 is a valve seat 19 of any suitable construction, here shown as provided by a threaded thimble received in a threaded opening in said partition 18 and having a beveled port 20. Said casing 10 is provided with a tubular extension 21, here shown as in alinement with the inlet 15, but it may obviously be arranged in any other suitable way with respect to the casing, said extension 21 being exteriorly threaded to receive a ring nut 22 for retaining on said casing the valve operating mechanism next to be described. So far the elements referred to may be of any suitable construction and it is to be expressly understood that the form and character of these elements illustrated on the drawing have been selected for purposes of exemplification only.

Cooperating with the valve seat 20 is a valve member 23 of any suitable construction and material, here shown as in the form of a ball suitably attached, as by soldering or brazing, to the end wall 24 of a flexible member 25 which may be made of any suitable construction and material but preferably takes the form of a readily expansible and collapsible deeply corrugated tube or bellows of any suitable diameter, number of folds, etc. End wall 24 may be formed integrally with the corrugated lateral wall of said bellows, or, as shown, it may be formed separately from said bellows and hermetically sealed to the end corrugation in any suitable way. The opposite end of said bellows 25 is attached in any suitable way, as by brazing or soldering, to a plug 26 which has a hollow tubular extension 27 projecting toward the opposite movable end wall of said bellows and adapted to cooperate therewith to constitute a stop for limiting the extent to which said bellows may be contracted. In order to reduce "singing" and other noises, and also dampen the movement of said valve member, a drag spring 28 is attached to the movable end wall 24 in any suitable way and cooperates with the inner wall of said tubular extension 27 to dampen out irregular movements of the movable end wall 24. As shown, said drag spring is attached to the movable end wall by insertion through apertures formed therein, which apertures may then be sealed in any suitable way as by soldering, and if desired a transverse pin 29 may be passed through the loop of said drag spring and project interiorly of the movable end wall into cooperating relationship with diametrically disposed slots 30 formed in said tubular extension 27, the ends of said pin sliding in said slots 30 and preventing rotational displacement of the bellows 25 and the valve member 23 with respect to the plug 26.

Attached to the stationary end of the bellows 25 in any suitable way, as by soldering or brazing, is a flanged mounting ring 31 of a diameter such that it may be received on the outer face of the tubular extension 21. Said flanged member 31 is retained on the end of the tubular extension 21 by a flanged supporting ring 32 with which cooperates the inwardly directed flange of the ring nut 22 whereby the ring 32 and flanged member 31 may be fixedly clamped to the end of the tubular extension 21.

Suitably attached to the ring 32, which constitutes a mounting member therefor, is a housing 33, preferably formed of heat insulating material such as bakelite and having interiorly projecting lugs 34 through which screws 35 may be passed to attach said housing 33 to the ring 32. If preferred, the housing may also be doweled to ring nut 22, as shown at 36, to prevent relative rotation therebetween.

Fixedly mounted within said housing 33 and projecting through an aperture 37 therein so that it extends exteriorly of said housing where it is subjected to convection currents of air flowing thereover, and preferably at the diametrically opposite side of the valve casing 10 from the tail piece 12, is a container for a volatile liquid. The extent to which said container projects from the housing 33 may be varied to produce the desired action, as will appear from the herein described manner and principle of operation. As shown said container is composed of a tubular exterior member 38 having a curved integral end wall and said member may be conveniently formed from drawn sheet metal. Intermediate its ends member 38 is provided in its lateral wall with a bead 39. Mounted within said tubular member 38 and located by said bead 39 is a flanged ring 40 suitably attached to tubular member 38 as by soldering. The inwardly projecting flange 41 of said ring 40 is suitably attached, as by soldering or brazing, to one end of a flexible wall, here shown as a deeply corrugated tubular bellows 42. At its opposite end said bellows 42 has a movable end wall 43 which may be suitably attached to the bellows or, as shown, be formed integrally therewith. Interposed between said movable end wall 43 and a spring seat 44 of any suitable character and secured within the tubular member 38 in any suitable way is a coil spring 45.

The chamber 46 provided between said bellows 42 and said member 38 is designed to be filled with a volatile liquid, and to this end a filling tube 47 is shown as projecting through the flange 41 and may be suitably sealed after the charge has been introduced into the chamber 46, although any other suitable provision for filling said chamber 46 may be provided if preferred.

Communicating with the chamber 46 is a tube 48, here shown as also leading through the flange 41, and having its opposite end extending through or communicating with a passage 49 formed in the plug 26, whereby said chamber 46 is in communication with the chamber within the tubular extension 27, and therefore with the interior of the bellows 25, through said tube 48.

Tube 48 is preferably flexible in construction and may be of any suitable length to facilitate charging and testing of the system. As here shown, said tube is materially longer than the distance between said flange 41 and the plug 26, and said tube is formed into a coil as shown at 50 which is located within the chamber 51 provided within the housing 33 so that said tube is wholly inside of said housing.

To adjust the size of chamber 46 a collar 52 is mounted in any suitable way on a rectilinearly movable rod 53 and engages the movable end wall 43 of the bellows member 42. As shown, said collar 52 may be of a size to fill the recessed end of said end wall 43, so that there will be a relatively large area of contact between the two. Rod 53 is mounted for rectilinear movement in an aperture 54 provided in a flanged transverse bracket 55 which may be attached at its opposite extremities to the inner skirt-like end of the tubular member 38, as by the rivets shown at 55', said bracket being also provided with a plate-like extension 56 which is clamped to the lug or lugs 34 by the screws 35, thereby mounting the container 38 in position. If it is desired to prevent direct metallic conduction of heat to said bracket 56 by the screws 35, washers 35' of insulating material may surround said screws between the heads thereof and the lugs 34. Rotatably mounted in an aperture 57 in said extension 56 of said bracket and held against axial displacement therein, is a cam 58. As shown, the cam 58 has a portion of reduced diameter which projects through the aperture 57 wherein it is retained by a ring key 59. Cam 58 is shown as of the snail type, (see Fig. 2) and has its operating face in engagement with the inner end of the rectilinearly movable rod 53. Said cam also has an axial bore adapted to receive the hub 60 of an operating stem, said hub and bore being shown as provided with a plurality of coacting fins and grooves so that said hub may be locked against relative rotation with respect to said cam in any one of a plurality of positions. Operating stem 61 extends outwardly through a cover plate 62 which may be secured to the housing 33 in any suitable way and be of any suitable material, and at its outer end said stem has an enlargement 63 to which is molded or otherwise suitably attached an operating knob or handle 64. Said stem 61 is free to rotate within the aperture 65 of the cover plate 62, but it is preferably locked against axial displacement with respect thereto as by means of a ring key 66.

In order that the rotation of cam 58 may be limited to less than 360°, so that by no possibility can the shoulder 67 on cam 58 interlock with the end of the rod 53 and cause injury if an effort is made to thereafter reverse the direction of rotation of the cam, a member 68 is mounted on the stem in any suitable way and has a nose that is adapted to engage a lug 69, here shown as projecting inwardly from the cover plate 62. If preferred, said member 68, or a separately provided pointer member, may act as a visible indicator and be disposed exteriorly of the cover plate 62, for cooperation with an exteriorly projecting lug, in which event the cover plate 62 may be provided with suitable indicia to show the condition of adjustment of the cam 58.

The container 38 and its associated members mounted on the bracket 55, 56 constitute a unit which may be introduced through the aperture 37 into the chamber 51 of the housing 33, and the bracket extension 56 may be clamped to the lugs 34 by the screws 35 which also secure the housing 33 to the ring 32. The cam 58 constitutes a part of said unit, and is secured in the aperture 57 by the ring key 59 before said unit is introduced into the casing 33. The operating stem 61 with its knob 64 and stop member 68 having been assembled with the cover plate 62, the unit thereby provided may be assembled with the casing 33, the hub 60 interlocking with the aperture in the cam 58 by reason of the plurality of interengaging ribs and grooves as heretofore explained. Thereupon the cover plate 62 may be secured to the housing member 33 in any suitable way and the unit is complete. As the bellows 25 with its attached valve member 23 and flange member 31 and the mounting ring 32 may be assembled with the valve casing 10 as heretofore explained, the entire device constitutes a unit that is easy to assemble and disassemble and mount in operative position, while said unit is composed of simple parts that are relatively inexpensive to manufacture and that may be readily standardized and produced in quantity without the use of highly skilled labor.

In operation, the container 38 for the volatile liquid is subjected to the air being heated by the radiator 14 and is influenced by variations in the temperature thereof as reflected in the convection currents flowing over said container. Assuming that the parts are in the position shown in Fig. 1 and that the temperature rises, expansion of the liquid in the chamber 46 will result in a small portion of said liquid, whose volume is predetermined by the cubical expansion of the liquid in the chamber 46, being forced through the tube 48 into the chamber within the bellows 25. As said bellows 25 is subjected to the temperature of the heating medium, said vessel 25 constitutes a hot chamber wherein the liquid injected thereinto is immediately vaporized by heat derived from the heating medium. Said vaporized liquid under the temperature and pressure existing in the bellows 25 causes the motor vessel constituted by said bellows 25 to expand and move the valve member toward its seat, thereby reducing the flow of heating medium through the port 20. Successive increments of temperature increase are accompanied by successive and corresponding increments of liquid injection into the bellows 25, and the latter thereby is subjected to a pressure which varies with the changes of temperature at the container 38 to move the valve member with respect to its seat. If the temperature at the container 38 decreases there is a corresponding cubical contraction of the liquid within the chamber 46, permitting withdrawal of some of said liquid from the tube 48, whereby some of the vapor will flow into the tube from the bellows 25 and condense in said tube, thereby effecting a reduction in the pressure in the bellows 25. Bellows 25 will thereupon contract under the influence of its inherent resiliency or a spring may be suitably associated therewith if preferred, and the valve member will be correspondingly opened.

As the container 38 is mounted on the valve housing 10, it is in close adjacency to the radiator and the heating fluid flowing through the inlet 16. Although said container 38 is shielded and somewhat insulated by the housing member 33, its temperature is maintained relatively high as compared with the surrounding air by reason of the manner of its support on the parts through which the heating medium is flowing, and the heat which may be transmitted to the interior of the housing 33 through the aperture 70 in the base thereof. The dimensions of these parts and openings are so chosen that the container 38 is maintained at a temperature which is close to the boiling point of the liquid within the chamber 46. As the coefficient of cubical expansion of a vaporizable liquid is greater adjacent its boiling temperature than at a lower temperature, the sensitivity of the device is thereby materially increased because of the fact that the change in volume of the liquid in the chamber 46 and tube 48 per degree change in temperature is greater at the temperature at which said container is maintained, with the result that smaller changes in temperature produce the requisite injection of vaporizable liquid into the bellows 25 to produce a predetermined movement of the valve member.

Additionally, when steam is used as the heating medium, changes in the pressure of the steam are accompanied by changes in the temperature of the steam, and this change in the temperature of the steam is reflected in the temperature at the container 38. Therefore if the steam pressure rises the vessel 38 is brought closer to the boiling temperature of the contained liquid and the sensitivity thereof is increased while, at the same time, the change in temperature at the container 38 will result in a corresponding change in the volume of the liquid injected into the bellows 25, thereby changing the position of the valve member to modify the flow of steam in conformity with the change in its heating effects. A corresponding decrease in the pressure of the steam will result in a decrease of temperature at the container 38 and produce the opposite effect both as to the sensitivity and the actuation of the valve member.

The movable end wall 43 of the bellows 42 is normally maintained against the collar 52 by the coil spring 45 and the cubical expansion and contraction of the liquid 46 has no effect upon the volume within said chamber. If it is desired to increase the temperature at which the valve is closed knob 64 is rotated in such a direction as to move the cam 58 so that the portion thereof opposite the rod 53 is radially nearer the axis of the cam. Spring 45 will thereupon move the movable end wall 43 and rod 53 to the right, as viewed in Fig. 2, within the limits permitted by the cam 58, and the volume of the chamber 46 will be correspondingly increased. Therefore a greater cubical expansion of the liquid in said chamber will be required before liquid is injected into the motor vessel 25. Conversely, if it is desired that the valve be closed at a lower temperature, the cam is rotated in the opposite direction so as to move the rod 53 to the left as viewed in Fig. 1, which will decrease the volume of the chamber 46, against the tension of the spring 45, and a smaller cubical expansion of the liquid in said chamber will effect an injection into chamber 25 and the actuation of the valve. By preference the highest point of the cam is so selected that when brought into engagement with the rod 53 the volume of the chamber 46 is so decreased that the motor vessel is supplied with vapor and the valve maintained closed at the lowest temperature which would ever be maintained in the room.
It will therefore be perceived that a device has been provided wherein a temperature regulator for a heat exchanger is mounted in unitary relationship with the valve to be controlled, and constitutes therewith a relatively compact and simple unit that takes up little additional space over that occupied by the usual hand operated valve. At the same time the regulator is sensitively responsive to changes in temperature of the air and the device thus provided will accurately and sensitively proportion the flow of heating medium to maintain a predetermined temperature in the room or other space being heated. It will also be perceived that in conformity with the present invention advantage is taken of the increased coefficient of expansion and contraction of vaporizable liquids at temperatures just below their boiling points, so that the sensitivity of the device is increased by the resulting action of the thermo-sensitive liquid. Furthermore the present invention provides for changes in the pressure of the heating medium compensating for the corresponding changes in temperature by conditioning or operating the valve mechanism so as to maintain the predetermined temperature. Thereby a substantially straight line temperature control is maintained irrespective of fluctuations in the pressure of the heating medium.

While the embodiment of the invention illustrated on the drawing has been described with considerable particularity, it is to be expressly understood that the invention is not restricted thereto, as the same may take a variety of mechanical expressions, as will now be apparent to those skilled in the art, while changes may be made in the details of construction, arrangement and proportion of parts, certain features may be used without other features, other forms of container for the vaporizable liquid may be used, other forms of motor vessel may be employed, other characters of cam and operating mechanism may be utilized for varying the volume of the chamber 46, etc., without departing from the spirit of this invention. Reference is therefore to be had to the appended claims for a definition of this invention.

What is claimed is:

1. In a temperature regulator for heat exchangers, in combination with a valve casing containing a valve member for controlling the flow of a heating medium, an expansible and collapsible motor vessel operatively connected to said valve member and subjected to the heat of said medium whereby it constitutes a vaporizing chamber for a vaporizable liquid, a housing mounted on said valve casing, and having the interior thereof heated from said valve casing, and a container for said vaporizable liquid communicating with said vessel and mounted on said housing, said container including a relatively rigid exterior wall projecting exteriorly of said housing into the air currents flowing past said casing and providing direct metallic conduction between said air currents and liquid contained therein.

2. In a temperature regulator for heat exchangers, in combination with a valve casing containing a valve member for controlling the flow of a heating medium, an expansible and collapsible motor vessel operatively connected to said valve member and subjected to the heat of said medium whereby it constitutes a vaporizing chamber for a vaporizable liquid, a container for said vaporizable liquid communicating with said vessel, said container including a relatively rigid outer wall projecting into the convection air currents flowing past said casing, and a housing for said container providing a mounting therefor and in such heat interchanging relation with the medium within said casing that said container is maintained at a temperature near the boiling point of the contained liquid.

3. In a temperature regulator for heat exchangers, in combination with a valve casing containing a valve member for controlling the flow of a heating medium, an expansible and collapsible motor vessel operatively connected to said valve member and subjected to the heat of said medium whereby it constitutes a vaporizing chamber for a vaporizable liquid, a container for said vaporizable liquid communicating with said vessel, said container including a relatively rigid outer wall projecting into the convection air currents flowing past said casing, and a housing for said container provided with an aperture through which said container projects into the air currents and a second aperture through which heat from said casing is conveyed to said container whereby said container is maintained at a temperature that is near to the boiling point of said liquid.

4. In a temperature regulator for heat exchangers, in combination with a valve casing containing a valve member for controlling the flow of a heating medium, an expansible and collapsible motor vessel operatively connected to said valve member and subjected to the heat of said medium whereby it constitutes a vaporizing chamber for a vaporizable liquid, a container for said vaporizable liquid communicating with said vessel, a housing for said container so constructed that said container is heated by the medium in said valve casing, said container including a relatively rigid exterior wall projecting into the path of the air currents flowing past said casing and an interior expansible and collapsible wall for varying the volume of said container, and means cooperating with said last named wall for expanding and contracting the same.

5. In a temperature regulator for heat exchangers, in combination with a valve casing containing a valve member for controlling the flow of a heating medium, an expansible and collapsible motor vessel operatively connected to said valve member and subjected to the heat of said medium whereby it constitutes a vaporizing chamber for a vaporizable liquid, a container for said vaporizable liquid communicating with said vessel, a housing for said container in heat interchanging relation with said valve casing whereby said container is heated from the medium in said valve casing to a temperature near the boiling point of said liquid, said container including a relatively rigid exterior wall projecting into the path of the air currents flowing past said casing and an interior expansible and collapsible wall for varying the volume of said container, and means cooperating with said last named wall for expanding and contracting the same and including a rectilinearly movable thrust element cooperating with said expansible and collapsible wall, resilient means maintaining said wall and thrust element in cooperative relationship, and means varying the position of said thrust element.

6. In a temperature regulator for heat exchangers, in combination with a valve casing containing a valve member for controlling the flow of a heating medium, an expansible and collapsible motor vessel operatively connected to said valve member and subjected to the heat of said medium whereby it constitutes a vaporizing chamber for a vaporizable liquid, a container for said vaporizable liquid communicating with said vessel, a housing for said container in which said container is mounted in heat interchanging relation with said valve casing, said container including a relatively rigid exterior wall projecting into the path of the air currents flowing past said casing and a bellows disposed interiorly and coaxially of said container and expansible and collapsible to vary the volume thereof, and means for expanding and collapsing said bellows.

7. In a temperature regulator for heat exchangers, in combination with a valve casing containing a valve member for controlling the flow of a heating medium, an expansible and collapsible motor vessel operatively connected to said valve member and subjected to the heat of said medium whereby it constitutes a vaporizing chamber for a vaporizable liquid, a container for said vaporizable liquid communicating with said vessel, said container including a relatively rigid exterior wall projecting into the path of the air currents flowing past said casing and a reentrant bellows disposed interiorly and coaxially of said container and expansible and collapsible to vary the volume thereof, and means for expanding and collapsing said bellows including a thrust member cooperating with the movable end wall of said bellows, resilient means normally maintaining said wall and thrust member in cooperative relationship, and a rotatable cam for varying the position of said thrust member.

8. In a temperature regulator for heat exchangers, in combination with a valve casing containing a valve member for controlling the flow of a heating medium, an expansible and collapsible motor vessel operatively connected to said valve member and subjected to the heat of said medium whereby it constitutes a vaporizing chamber for a vaporizable liquid, a container for said vaporizable liquid communicating with said vessel and mounted in unitary relationship with said valve casing, said container including a relatively rigid exterior wall and a flexible reentrant member providing a chamber for said liquid therebetween, and means for flexing said member to vary the volume of said container including a thrust element, a cam for operating the same, and a manually operable stem for rotating said cam, said cam and stem having provision for interlocking engagement in a plurality of angularly related positions.

9. In a temperature regulator for heat exchangers, in combination with a valve casing containing a valve member for controlling the flow of a heating medium, an expansible and collapsible motor vessel operatively connected to said valve member and subjected to the heat of said medium whereby it constitutes a vaporizing chamber for a vaporizable liquid, a container for said vaporizable liquid communicating with said vessel, said container including a relatively rigid exterior wall projecting into the path of the convection air currents flowing over said casing, and a housing for supporting said container and having a lateral opening through which said container projects into said air currents, said housing having means for supporting the same in unitary relationship with said valve casing and having in its base a relatively large opening whereby said housing receives heat from the interior of said casing and said container is maintained at a temperature closely adjacent the boiling point of said liquid.

10. In a temperature regulator for heat exchangers, in combination with a valve casing containing a valve member for controlling the flow of a heating medium, an expansible and collapsible motor vessel operatively connected to said valve member and subjected to the heat of said medium whereby it constitutes a vaporizing chamber for a vaporizable liquid, a container for said vaporizable liquid communicating with said vessel, said container projecting into the path of air currents flowing over said casing, and a housing for said container having an aperture through which said container projects into the air currents and a second aperture through which heat is transmitted to said container from the interior of said casing whereby said container has a temperature that varies with the temperature of the heating medium.

11. In a temperature regulator for heat exchangers, in combination with a valve casing containing a valve member, an expansible and collapsible motor vessel operatively connected to said valve member, said vessel being subjected to the heating medium and constituting a vaporizing chamber for a vaporizable liquid, a housing mounted on said valve casing and having a lateral opening in a wall thereof, a container for a vaporizable liquid having a relatively rigid exterior wall projecting through said aperture into the path of the air currents flowing past said casing, a conduit connecting said container and said vessel, and means whereby said container is heated from said valve casing.

12. In a temperature regulator for heat exchangers, in combination with a valve casing containing a valve member, an expansible and collapsible motor vessel operatively connected to said valve member, said vessel being subjected to the heating medium and constituting a vaporizing chamber for a vaporizable liquid, a housing mounted on said casing and having an opening in a lateral wall thereof, a container for a vaporizable liquid communicating with said vessel and having a relatively rigid exterior wall, and means in said housing for supporting said container in a position projecting through said aperture to the exterior of said housing and into the path of the air currents flowing past said casing whereby said container is in heat interchanging relation with air currents exteriorly of said housing.

13. In a self-contained temperature regulating unit for radiators, in combination with a valve casing containing a valve member, an expansible and collapsible motor vessel operatively connected to said valve member at one end and detachably secured to said casing at its opposite end, said vessel being subjected to the heating medium and constituting a vaporizing chamber for a vaporizable liquid, a housing mounted on said casing and having an opening in the lateral wall thereof, a container for vaporizable liquid projecting through said aperture into the path of the air currents flowing over said casing, a conduit in communication with said vessel and container, and means for varying the cubical content of said container including a bellows-like wall projecting into said container and defining the inner limits thereof, and means for expanding and contracting said bellows-like wall member.

14. In a self-contained temperature regulating unit for radiators, in combination with a valve casing containing a valve member, an expansible and collapsible motor vessel operatively connected to said valve member at one end and detachably secured to said casing at its opposite end, said vessel being subjected to the heating medium and constituting a vaporizing chamber for a vaporizable liquid, a housing mounted on said casing and having an opening in the lateral wall thereof, a container for vaporizable liquid projecting through said aperture into the path of the air currents flowing over said casing, a conduit in communication with said vessel and container, and means for varying the cubical content of said container including a bellows-like wall projecting into said container and defining the inner limits thereof, means for expanding and contracting said bellows-like wall comprising a thrust member and a rotatable cam, a stem rotatably mounted in said housing, and an operating knob on said stem.

15. In a self-contained temperature regulating unit for radiators, in combination with a valve casing containing a valve member, an expansible and collapsible motor vessel operatively connected to said valve member at one end and detachably secured to said casing at its opposite end, said vessel being subjected to the heating medium and constituting a vaporizing chamber for a vaporizable liquid, a base ring detachably secured to said casing, a housing detachably connected to said base ring, and a container for a vaporizable liquid mounted in said housing and communicating with said vessel, said container including a rigid exterior wall projecting through an opening in said housing into the path of the air currents flowing over said casing.

16. In a self-contained temperature regulating unit for radiators, in combination with a valve casing containing a valve member, an expansible and collapsible motor vessel operatively connected to said valve member at one end and detachably secured to said casing at its opposite end, said vessel being subjected to the heating medium and constituting a vaporizing chamber for a vaporizable liquid, a base ring mounted on said casing, a housing detachably connected to said base ring, a bracket within said housing, a container for a vaporizable liquid mounted on said bracket and communicating with said vessel, said container including a rigid exterior wall projecting through an opening in said housing into the path of the air currents flowing over said casing and a flexible interior wall, and means for varying the position of said flexible interior wall to adjust the volume of said container, said last named means including a member operatively connected to said flexible interior wall and a rotatable member for operating the same.

17. In a self-contained temperature regulating unit for radiators, in combination with a valve casing containing a valve member, an expansible and collapsible motor vessel operatively connected to said valve member at one end and detachably secured to said casing at its opposite end, said vessel being subjected to the heating medium and constituting a vaporizing chamber for a vaporizable liquid, said motor vessel having attached to the opposite ends thereof a tubular member and a drag spring cooperating therewith to dampen the relative movements thereof, a housing mounted on said casing, and a container for a vaporizable liquid mounted in said housing and projecting through an opening thereof into the path of the air currents flowing over said casing, said container adapted to be filled with a vaporizable liquid and having means of communication with the interior of said vessel.

18. In a self-contained temperature regulating unit for radiators, in combination with a valve casing containing a valve member, an expansible and collapsible motor vessel operatively connected to said valve member at one end and detachably secured to said casing at its opposite end, said vessel being subjected to the heating medium and constituting a vaporizing chamber for a vaporizable liquid, a housing mounted on said casing, and a container for a vaporizable liquid mounted in said housing and projecting through an opening thereof into the path of the air currents flowing over said casing, said container adapted to be filled with a vaporizable liquid and having means of communication with the interior of said vessel, and said housing having means for transmitting heat from said casing to the interior of said housing to heat said container.

19. In a self-contained temperature regulating unit for radiators, in combination with a valve casing containing a valve member, an expansible and collapsible motor vessel operatively connected to said valve member at one end and detachably secured to said casing at its opposite end, said vessel being subjected to the heating medium and constituting a vaporizing chamber for a vaporizable liquid, a housing mounted on said casing, a container for a vaporizable liquid mounted in said housing and projecting through an opening thereof into the path of the air currents flowing over said casing, said container adapted to be filled with a vaporizable liquid and having means of communication with the interior of said vessel, and means for varying the volume of said container, said housing having means for transmitting heat from said casing to the interior of said housing to heat said container.

20. In a self-contained temperature regulating unit for radiators, in combination with a valve casing containing a valve member, an expansible and collapsible bellows vessel having one end operatively connected to said valve member, said vessel constituting a vaporizing chamber for a vaporizable liquid, a flange connected to the opposite end of said bellows vessel, a supporting ring, means for clamping said flange and supporting ring to the end of said casing, a housing attached to said supporting ring, a container for a vaporizable liquid projecting through an opening to the exterior of said housing and having a relatively rigid exterior wall and a relatively flexible interior wall, means of communication between said container and said motor vessel, and means mounted within said housing and operable from the exterior thereof for flexing said interior wall and varying the volume of said container, said means including a thrust element cooperating with said flexible wall, resilient means for maintaining said flexible wall in cooperative relationship with said thrust element, a rotatable cam coacting with said thrust element, and a stem operatively connected to said cam and projecting through a wall of said housing.

JEAN V. GIESLER.
WILLIAM B. MACKINTOSH.